United States Patent [19]

Maltby

[11] 4,042,497

[45] Aug. 16, 1977

[54] SEPTIC SYSTEM WITH LEVEL CONTROL

[76] Inventor: Frederick L. Maltby, 780 Glen Road, Jenkintown, Pa. 19046

[21] Appl. No.: 639,797

[22] Filed: Dec. 11, 1975

[51] Int. Cl.² ............................................. C02C 1/00
[52] U.S. Cl. ......................................... 210/25; 73/73; 210/70; 210/104; 210/109; 210/257 R; 210/532 S

[58] Field of Search ................. 210/25, 86, 76, 73.55, 210/97, 104, 109, 134, 257 R, 532; 137/2, 804, 805, 386, 392, 395; 73/73

[56] References Cited

U.S. PATENT DOCUMENTS

| 3,342,138 | 9/1967 | Parks et al. | 137/392 X |
| 3,485,262 | 12/1969 | Perren | 137/386 |
| 3,724,664 | 4/1973 | Lemberger | 210/170 X |
| 3,777,976 | 12/1973 | Milovancevic | 73/73 X |
| 3,844,946 | 10/1974 | Farrell, Jr. | 210/104 |
| 3,874,590 | 4/1975 | Gibson | 73/73 X |
| 3,875,051 | 4/1975 | Kovarik | 210/104 X |
| 3,875,056 | 4/1975 | Inglis | 210/109 X |

OTHER PUBLICATIONS

Sewage and Sewerage of Farm Homes a U. S. Department of Agriculture Bulletin, 1928 pp. 39-41.

Primary Examiner—John Adee
Attorney, Agent, or Firm—Woodcock, Washburn, Kurtz & MacKiewicz

[57] ABSTRACT

Liquid waste material passes from a septic tank to a holding tank prior to being pumped into a tiled drain field. The liquid waste material is only pumped into the drain field when the liquid saturation of the soil in and around the drain field is below a predetermined level. The saturation level is determined by RF admittance sensing probes which extend into the soil in the area of the drain field.

19 Claims, 3 Drawing Figures

SEPTIC SYSTEM WITH LEVEL CONTROL

BACKGROUND OF THE INVENTION

This invention relates to on-site sewage or waste disposal systems where liquid waste material is absorbed by soil at the site.

At the present time, most septic sewage systems are permitted only in situations in which proper operation can be assured under all conceivable conditions. Even though a system can operate to dispose of sewage under almost all circumstances, the absence of a safety factor to permit use under all circumstances prevents the use of this type of on-site system.

The critical limitation in systems of this type is the ability of the soil to absorb liquid waste material. In areas where the percolation of the soil is poor and/or the water table is high, the soil is unable to absorb the liquid waste material flowing into the septic system. More particularly, where the water table is high, an insufficient amount of soil is available between the tile field and the water table to properly purify the waste before entry into the water table. If the soil in the drain field itself is saturated or there is a false water table around the drain field, the liquid waste material may leach to the surface.

Since the typical septic system operates on a demand basis, i.e., liquid waste material is discharged into the soil whenever the system is used and regardless of soil conditions, even periodic reductions in percolation due to saturation of the drain field or rises in the water table are intolerable since the septic system may be called upon for a discharge of liquid waste material when the water table or saturation of the soil is high. In other words, the very nature of the demand septic system requires a safety factor to assure proper operation under all conditions.

In contrast to the typical demand septic system, U.S. Pat. No. 3,844,946 — Farrel, Jr. discloses a system wherein the liquid waste material is stored in a holding tank and periodically discharged into the soil in large slugs. According to this patent, the discharge of the liquid waste material into the soil in large slugs greatly increases the ability of the soil to absorb the liquid waste material. It is particularly important to note that the discharge of liquid waste material into the soil appears to occur regardless of the soil saturation conditions.

SUMMARY OF THE INVENTION

It is an object of this invention to provide a liquid waste or sewage disposal method and system of the soil absorption type which is capable of operating under soil and water table conditions heretofore considered unsuitable for such a system.

It is a more specific object of this invention to provide such a method and system even though the water table is periodically high.

It is a further specific object of this invention to provide such a method and system even though the soil in the drain field is periodically saturated.

It is a still further specific object of this invention to provide such a method and system even though there is a false water table around the drain field.

In accordance with these and other objects of the invention, a preferred embodiment comprises storage means for storing liquid waste material and drain means for draining the liquid waste material into the adjacent soil. Transfer means transfer the liquid waste material from the storage means to the drain means in response to the liquid saturation of the soil as determined by sensor means. To assure proper absorption of the liquid waste material, the sensor means only activates the transfer means to transfer the liquid waste material to the drain means when the liquid saturation of the soil in and around the drain means is below a predetermined level.

In a preferred embodiment of the invention, the drain means comprises a drain field and the sensor means senses when the water saturation reaches a predetermined level within the drain field. In addition, the sensor means may sense when the water table rises to a level within a predetermined distance below the drain field. It may also be desirable to have the sensor means determine when a false water table reaches a predetermined level around the drain field.

In the preferred embodiment, the storage means comprises a holding tank and the transfer means comprises a pump for pumping the liquid waste material from the holding tank to the drain field. Preferably, the storage means comprises a septic tank connected to the holding tank. The sensor means may comprise one or more RF admittance sensing probes which are inserted into the soil.

In accordance with one important aspect of the invention, the liquid waste material is discharged into the septic tank and drain field at a rate less than the peak discharge rate into the holding tank. The discharge of the fluid waste material into the soil may occur during periods in which the fluid waste material is not entering the holding tank thereby avoiding an overload in the drain field.

DETAILED DESCRIPTION OF A PREFERRED EMBODIMENT

Figure 1:
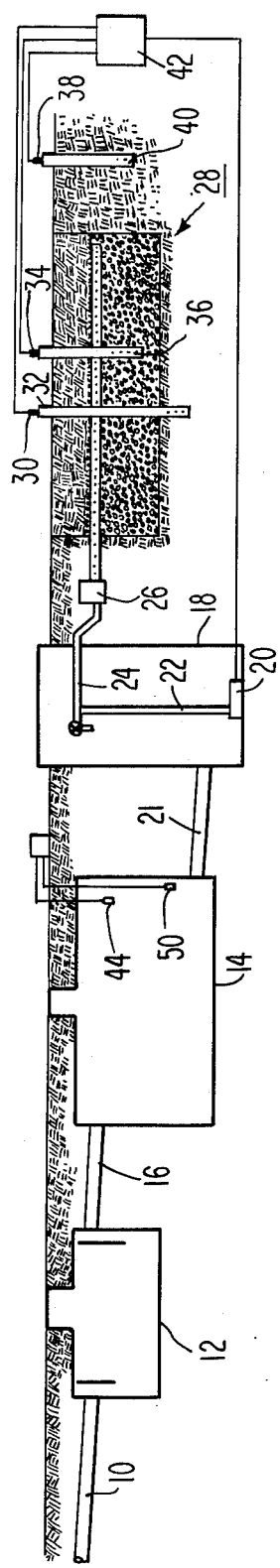
FIG. 1 is a simplified sectional view of a system representing the preferred embodiment of the invention.

As shown in FIG. 1, sewage waste material is discharged through a conduit 10 into storage means comprising a septic tank 12 and a holding tank 14 connected by a pipe 16. A pumping station 18 with a pump 20 located at the bottom and connected to the tank 14 through a pipe 21 lifts sewage through a pipe 22. The sewage then leaves the pumping station through a pipe 24 which is connected to a baffled distributor box 26 which distributes the sewage to a drain field 28.

In accordance with this invention, a plurality of sensors are provided in the area of the drain field for sensing the degree of saturation in the soil. The sensors include a first RF admittance sensing probe 30 which includes a probe electrode which extends below the drain field 18 in a perforated pipe 32 so as to sense when the water table rises within a predetermined distance from the bottom of the drain field 28. A second RF admittance sensing probe 34 includes a probe electrode which extends through a perforated pipe 36 for sensing the saturation level of the drain field itself. A third sensor includes a probe 38 with an electrode which extends through a perforated pipe 40 into the soil adjacent and around the drain field 28 so as to indicate the presence of a false water table which is characteristic of certain soils.

The RF admittance sensing probes 30, 34 and 38 are connected to associated probe circuitry 42 which is in turn connected to the pump 20. The pump control 42 activates the pump 20 in response to the output from the probes 30, 34 and 38 as will now be described.

The sewage or waste material flows through the conduit 10 into the septic tank 12 and the holding tank 14 on a demand basis regardless of the soil conditions. When the sensor probes 30, 34 and 38 indicate that the soil conditions in and around the drain field 28 are proper for soil absorption, i.e., the water table both false and actual are sufficiently low and the saturation in the drain field 28 is sufficiently low, the pump 20 will be activated by the pump circuitry 42 to transfer the liquid waste material from the storage site within the holding tank 14 from where it is discharged to the drain field 28.

If any of the sensors 30, 34 and 38 should detect a condition which renders the soil unsuitable for proper absorption of the liquid waste material, the pump 20 will be shut down and the tank 14 will be allowed to fill with discharge from the conduit 10. In order to prevent the overflow of the liquid waste material in the tank 14, a level sensor 44 and alarm 46 as better shown in FIG. 2b may be provided. When the high level alarm 46 is activated by a level 48 shown in FIG. 2b, appropriate action may be taken to remove the liquid waste material from the tank 12, e.g., a tank truck may be utilized to pump the tank 12 down to a low level and hauled away. Of course, the liquid waste material within the tank truck may be disposed of as by discharge into a municipal sewage system. A low level sensor 50 is also connected to the alarm 46 so as to permit the pump 20 to be shut down when there is no sewage in the holding tank.

As shown, three different sensing probes 30, 34 and 38 are utilized. Each of these probes detects a different condition which is necessary for soil absorption of the liquid waste material.

The probe 34 detects the saturation within the drain field so as to only permit the pump 20 to discharge liquid waste material from the tank 14 into the drain field when such discharge will not result in leaching to the surface above the drain field 28. Of course, such leaching could produce undesirable odors on the surface and also create an undesirable collection of surface water.

The probe 30 is intended to detect when the water level rises to within a predetermined distance of the bottom of the drain field 28. As shown, the probe electrode extends down below the drain field 28 a distance of approximately 4 feet. This 4 foot distance is sufficient for liquid waste purification as the liquid percolates from the drain field down to the water table. Thus the water table is not contaminated by the liquid waste material. It will of course be appreciated that certain soils and conditions may require a distance other than 4 feet.

Finally, the probe 38 detects a so-called false water table in the area surrounding the drain field. In many areas, the chances of a false water table are sufficiently small so as to eliminated the necessity for probe 38.

As described in the foregoing, the probes 30, 34 and 38 are preferably RF level sensing probes. One particularly suitable probe system is the 406-1000 manufactured by Drexelbrook Engineering Company. The probe of this system utilizes a coat shield electrode of the type described in U.S. Pat No. 3,706,980 — Maltby — and is or the on-off type as also disclosed in the patent which is incorporated herein by reference. In other words, the probe is responsive to a predetermined liquid saturation level to turn the pump 20 on or off.

The level alarm 46 and sensors 44 and 50 may also comprise the Drexelbrook 406-1000. The level alarm 46 and associated sensors could, as alternative, be of the float type.

From the foregoing, it will be understood that the pump 20 will be activated at appropriate times so as to permit the liquid waste material which is collected in the tank 14 to be absorbed into the soil at the drain field 28. In this connection, it is particularly desirable to pump the liquid waste material into the septic sysftem at a rate which is less than the peak discharge rate through the conduit 10. This allows the tank 14 to serve as a buffer during periods of peak demand on the disposal system and only discharge the liquid waste material into the septic system for absorption into the soil at a rate at which the soil can adequately absorb the liquid. For example, it may be desirable for the pump 14 to discharge liquid waste material into the septic system at a rate of two gallons per minute even though the discharge through the conduit 10 may at times exceed 50 gallons a minute.

Figure 2A:
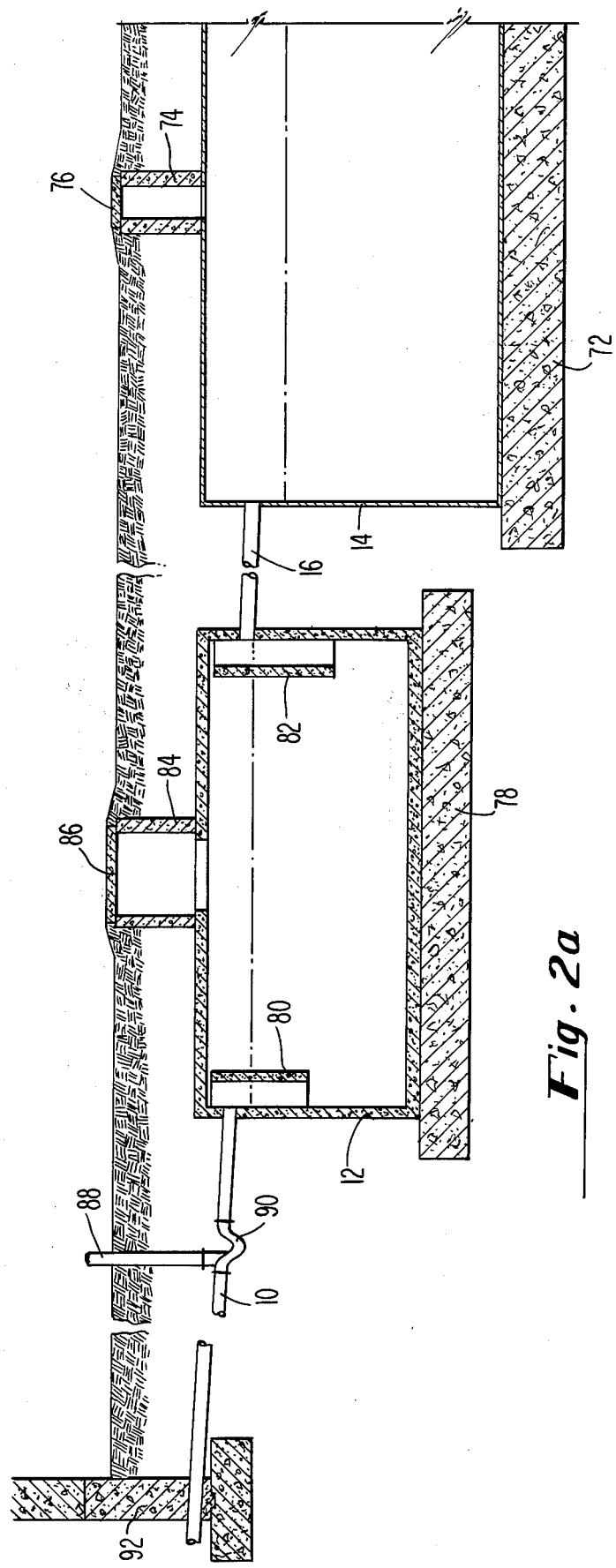
FIG. 2a and 2b are more detailed views of the system shown in FIG. 1.
Figure 2B:
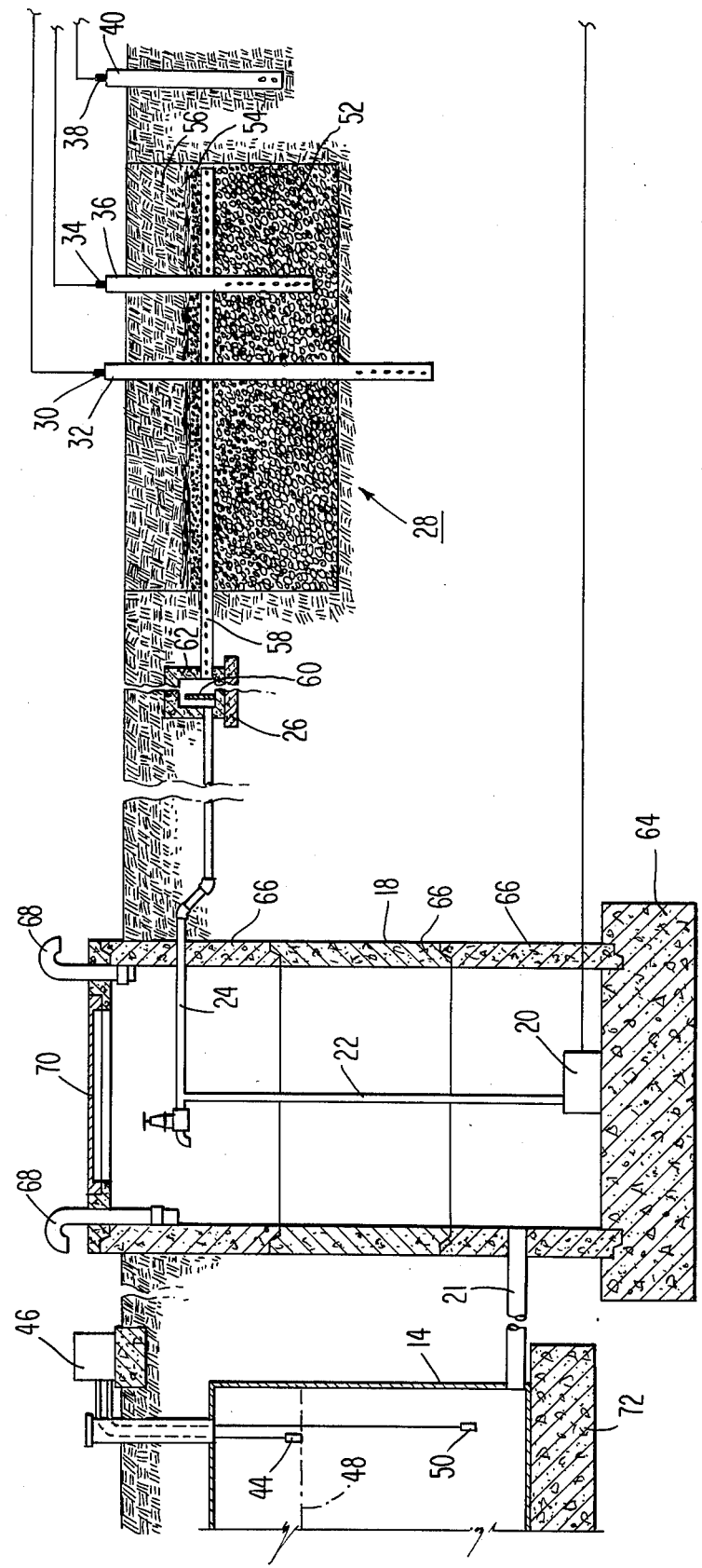

As shown somewhat better in FIG. 2b, each of the probes 30, 34 and 38 extend through perforated pipes 32, 36 and 40. The purpose of the pipes 32, 36 and 40 is to assure that the damp gravel 52 within the drain field 28 will not come into contact with the probes 30, 34 and 38 thereby eliminating false indications of liquid levels in the drain field. The perforations of the pipes 32, 36 and 40 also serve to keep the straw 54 and the earth back fill 56 above the gravel 52 from coming into contact with the probes 30, 34 and 38. Note that the perforations in the pipes are located only at the level of interest and the pipes and probes are sealed above the perforations.

Althought not shown in FIG. 1 or 2b, the pipe 40 and the probe 38 should extend down to any impervious subsoil layer such as clay which allows a false water table to collect above the actual water table below. The impervious layer may be located anywhere between the bottom of the gravel 52 in the drain field 28 on up to the top of the gravel 52. Accordingly, the depth of the probe 38 and the pipe 40 will be varied as the level of the impervious layer varies so as to assure that the probe 38 and the pipe 40 extend down to the impervious layer.

FIG. 2b also shows the drain field pipes 58 and the baffle box 26 in somewhat more detail. More particularly, the baffle box 26 is shown as including a baffle 60 within a housing 62.

The pumping station 18 comprises a concrete base 64 supporting concrete risers 66. The pump 20 is located on the concrete base 64. The top of the pumping station comprises vents 68 with a manhole 70 located therebetween so as to permit entry for maintenance purposes. Although not shown, more than one pump 20 may be provided with automatic alternation between the pumps.

As shown in FIGS. 2a and 2b, the holding tank comprises metal such as steel which is mounted on a concrete base 72. A pipe 74 extends upwardly from the tank 14 and is closed by a cover 76 so as to provide acess to the tank 14.

The septic tank 12 is also mounted on a concrete base 78. Baffles 80 and 82 are provided at the inlet from the pipe 10 at the outlet to the pipe 16. A pipe 84 extends upwardly to the surface and is closed by a cover 86 to also permit access to the septic tank 12. A ventilating pipe 88 extends upwardly to the surface from a point in the pipe 10 adjacent or at a trap 90. As also shown in FIG. 2a, the pipe 10 extends into a building through a foundation 92.

Although not shown in FIG. 2b, it is desirable to pump air into the upper end of the pipes 32, 36 and 40. The air pressure, while not excessively high, should be sufficient to prevent the rise of water up into the pipes 32, 36 and 40 above the actual water level so as to preclude a false indication of the saturation in and around the drain field. The air may be supplied to the pipes 32, 36 and 40 with hose connections at the upper ends of the pipes with the opposite ends of the hoses connected to an air compressor not shown.

Although a specific embodiment of the invention has been shown and described in detail, it will be understood that various modifications may be made therein without departing from the true spirit and scope of the invention as set forth in the appended claims.

What is claimed is:

1. A waste disposal system comprising:
   means for treating waste and storing liquid thereof;
   drain means for draining the liquid into the adjacent soil;
   transfer means for transferring the liquid from said means for treating and storing to said drain means; and
   sensor means for sensing the liquid saturation of said soil;
   said transfer means being coupled to said sensor means and being activated in response thereto to transfer said liquid waste material to said drain means when the liquid saturation is below a predetermined threshold.

2. The waste disposal system of claim 1 wherein said drain means comprises a drain field and said sensor means senses when the water table rises to a level within a predetermined distance below said drain field.

3. The waste disposal system of claim 1 wherein said drain means comprises a drain field and said sensor means senses when the liquid saturation reaches said predetermined level within said drain field.

4. The waste disposal system of claim 1 wherein said drain means comprises a drain field and said sensor means senses when water reaches a predetermined level around said drain field.

5. The waste disposal system of claim 1 wherein said drain means comprises a drain field and said sensor means senses when the level of water within said drain field reaches a predetermined level and further senses when the water table rises to a level within a predetermined distance below said drain field.

6. The waste disposal system of claim 5 wherein said sensor means also senses when water reaches a predetermined level around said drain field.

7. The waste disposal system of claim 1 wherein said sensor means comprises an RF probe for measuring the admittance of the soil.

8. The waste disposal system of claim 1 wherein said transfer means comprises a pump.

9. The waste disposal system of claim 8 wherein said means for treating and storing comprises a holding tank and said pump communicates with said holding tank to remove the liquid to said drain means.

10. The waste disposal system of claim 9 further comprising a level alarm for indicating when the liquid waste within said holding tank reaches a predetermined level.

11. The waste disposal system of claim 1 wherein said drain means comprises a drain field for discharging the liquid into the adjacent soil and said means for treating and storing comprises a septic tank and a holding tank connected to and following said septic tank, the liquid being transferred by said transfer means from said holding tank to said drain field.

12. A method for disposing of liquid waste material comprising the following steps:
    treating waste having a liquid portion;
    storing the liquid portion;
    sensing the liquid saturation of the soil near the site where the liquid is stored; and
    discharging the liquid portion from the site where the liquid is stored into the soil near the site only when the liquid saturation is below a predetermined level as determined by said sensing.

13. The method of claim 12 wherein the liquid portion is discharged into a drain field, said sensing of the liquid saturation further determining when the liquid within the drain field rises to a predetermined level.

14. The method of claim 13 wherein said sensing of the liquid saturation further determines when the water table rises to a level within a predetermined distance below the drain field.

15. The method of claim 14 wherein said sensing of liquid saturation also determines when the liquid around the drain field rises to a predetermined level.

16. The method of claim 12 wherein the peak discharge rates of the liquid into the site where the liquid is stored is greater than the maximum rate at which the liquid is discharged into the soil near the site where the liquid is stored.

17. The waste disposal system of claim 1, further comprising at least one sensor in a predetermined position in said adjacent soil adapted to determine when the water table rises to said predetermined threshold, said transfer means being coupled to and responsive to said at least one sensor.

18. A waste disposal system comprising:
    means for treating waste and storing the liquid portion thereof;
    drain means for draining the liquid portion into the adjacent soil, said drain means including a drain field for discharging the liquid portion into the adjacent soil;
    transfer means for transferring the liquid portion from said means for treating and storing to said drain field; and
    sensor means for sensing soil conditions within said drain field, said transfer means being coupled to said sensor means and being activated in response thereto to transfer the liquid portion to said drain field as a function of sensed soil conditions.

19. The waste disposal system of claim 18, further comprising water table sensor means for sensing when water reaches a predetermined level around said drain field, said water level sensor means being coupled to said transfer means and said transfer means being controllable in response to said sensed water level.

* * * * *

UNITED STATES PATENT AND TRADEMARK OFFICE
CERTIFICATE OF CORRECTION

PATENT NO. : 4,042,497
DATED : August 16, 1977
INVENTOR(S) : Frederick L. Maltby It is certified that error appears in the above-identified patent and that said Letters Patent are hereby corrected as shown below:

Column 1, line 39, "Farrel" should read --Farrell--.

Column 4, line 29, change "indications" to read --indication--.

Signed and Sealed this

Twelfth Day of September 1978

[SEAL]

Attest:

RUTH C. MASON
*Attesting Officer*

DONALD W. BANNER
*Commissioner of Patents and Trademarks*